UNITED STATES PATENT OFFICE.

JAMES JUDGE, OF NEW YORK, N. Y.

IMPROVED CEMENT FOR MAKING A WATER-TIGHT JOINT IN COPING, ROOFING, &c.

Specification forming part of Letters Patent No. 86,018, dated January 19, 1869.

*To all whom it may concern:*

Be it known that I, JAMES JUDGE, of the city, county, and State of New York, have invented a new and Improved Composition for Pointing Stone Coping, &c.; and I do hereby declare that the following is a full, clear, and exact description thereof, which will enable others skilled in the art to make and use the same.

My invention has for its object to furnish an improved composition for pointing stone coping upon roofs, in areas, and in other situations, which will make the joints perfectly water-tight, and will be unaffected by changes of temperature; and it consists in the composition prepared of the ingredients and in the proportions and manner hereinafter set forth and described.

In preparing this composition, I boil one pint of raw linseed-oil one and a half hour, and then add one-quarter of a pound of india-rubber and continue the boiling another hour and a half. The oil and rubber are then removed from the fire, and, while still hot, I add half a pound of tar, and then one pound of iron-dust, half a pound of marble-dust, and half a pound of hydraulic cement. The mixture is then thoroughly stirred, and removed from the pot to a table, and one and a half pound of whiting thoroughly mixed and worked into it. The composition is then ready for use or to be put up for market.

Having thus described my invention, I claim as new and desire to secure by Letters Patent—

The composition formed of the ingredients in the proportions and manner substantially as herein shown and described.

The above specification of my invention signed by me this 10th day of December, 1868.

JAMES JUDGE.

Witnesses:
    ALEX. F. ROBERTS,
    JAMES T. GRAHAM.